United States Patent
Flurry et al.

(10) Patent No.: US 7,188,155 B2
(45) Date of Patent: Mar. 6, 2007

(54) APPARATUS AND METHOD FOR SELECTING A WEB SERVICE IN RESPONSE TO A REQUEST FROM A CLIENT DEVICE

(75) Inventors: Gregory Alan Flurry, Austin, TX (US); Simon Antony James Holdsworth, Andover (GB)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 10/322,053

(22) Filed: Dec. 17, 2002

(65) Prior Publication Data

US 2004/0139151 A1    Jul. 15, 2004

(51) Int. Cl.
*G06F 15/16*    (2006.01)
*G06F 3/00*    (2006.01)

(52) U.S. Cl. .................. 709/219; 709/203; 719/315

(58) Field of Classification Search .............. None
See application file for complete search history.

(56) References Cited

U.S. PATENT DOCUMENTS

| | | |
|---|---|---|
| 6,581,094 B1 | 6/2002 | Gao |
| 6,476,833 B1 | 11/2002 | Moshfeghi |
| 6,697,849 B1 * | 2/2004 | Carlson ............... 709/219 |
| 6,748,569 B1 | 6/2004 | Brooke et al. |
| 2001/0047402 A1 | 11/2001 | Saimi et al. |
| 2002/0143819 A1 | 10/2002 | Han et al. |
| 2003/0093500 A1 | 5/2003 | Khodabakchian et al. |
| 2003/0095540 A1 | 5/2003 | Mulligan et al. |
| 2003/0133554 A1 | 7/2003 | Nykanen et al. |
| 2003/0204645 A1 | 10/2003 | Sharma et al. |
| 2003/0226107 A1 | 12/2003 | Pelegri-Llopart et al. |
| 2004/0006651 A1 * | 1/2004 | Dani et al. ............ 709/315 |
| 2004/0024841 A1 | 2/2004 | Becker et al. |
| 2004/0049574 A1 | 3/2004 | Watson et al. |

(Continued)

OTHER PUBLICATIONS

Diaz et al., "Web Services for Remote Portals (WSRP)", Internet Article, Jan. 21, 2002, http://www-106.ibm.com/developerworks/webservices/library/ws-wsrp/, Mar. 23, 2004, pp. 1-26.

(Continued)

*Primary Examiner*—Wen-Tai Lin
(74) *Attorney, Agent, or Firm*—Duke W. Yee; Jeffrey S. LaBaw; Cathrine K. Kinslow

(57) ABSTRACT

When a request is received from a client device for the invocation of a web services operation, an off-ramp device coupled to an on-ramp device that provides an interface to web services verifies that the requested service is in a configuration file and then determines the selection scope of a desired service. Based on the selection scope of the desired service, the off-ramp device can determine whether to perform discovery and selection of a service implementation ("request" selection scope), retrieve a service implementation from a session level cache ("session" selection scope), or retrieve a service implementation from an application level cache ("application" selection scope). If a service implementation corresponding to the requested service does not exist in the session or application level cache, the discovery and selection operations may be performed to identify a service implementation to handle the request and the service implementation may be stored in an appropriate cache.

25 Claims, 5 Drawing Sheets

U.S. PATENT DOCUMENTS

| | | | |
|---|---|---|---|
| 2004/0054690 A1 | 3/2004 | Hillerbrand et al. | |
| 2004/0059722 A1* | 3/2004 | Yeh et al. | 707/3 |
| 2004/0093580 A1 | 5/2004 | Carson et al. | |
| 2004/0205473 A1* | 10/2004 | Fisher et al. | 715/500 |
| 2006/0053087 A1 | 3/2006 | Pavlov | |

OTHER PUBLICATIONS

Goodman, "Accelerate your Web Services with Caching", Internet Article, Dec. 1, 2002, ftp://www6.software.ibm.com/software/developer/library/ws-cach1.pdf, Mar. 23, 2004, pp. 1-7.

Fremantle, "Applying the Web Services Invocation Framework", Internet Article, Jun. 2002, ftp://www6.software.ibm.com/software/developer/library/ws-appwsif.pdf, Mar. 23, 2004, pp. 1-7.

IBM Research Disclosure Bulletin, "Method of Enabling Automated Invocation of Web Services", vol. 455, No. 132, Mar. 2002, pp. 1-6.

U.S. Appl. No. 10/314,813, Berkland et al., Dynamic Web Service Implementation Discovery and Selection Apparatus and Method, filed Dec. 9, 2002.

Wolter, "Overview of SOAP Client in Windows XP", Microsoft Corporation, May 2001, pp. 1-10.

Ogbuji, "Using WSDL in SOAP applications", IBM Nov. 1, 2000, pp. 1-7.

Pallos, "Service-Oriented Architecture: A Primer", EAI Journal, Dec. 2001, pp. 32-35.

Tapang, "Web Services Description Language (WSDL) Explained", MSDN, Jul. 2001, pp. 1-17.

"Web Services White Paper", Sonera Plaza Ltd MediaLab, Jun. 12, 2002, pp. 1-10.

Web Service Description Language (WSDL) 1.1, Mar. 2001 (W3C).

* cited by examiner

APPARATUS AND METHOD FOR SELECTING A WEB SERVICE IN RESPONSE TO A REQUEST FROM A CLIENT DEVICE

RELATED APPLICATION

The present invention is related to the subject matter of co-pending and commonly assigned U.S. patent application Ser. No. 10/314,813 entitled "Dynamic Web Service Implementation Discovery and Selection Apparatus and Method," filed on Dec. 9, 2002, and hereby incorporated by reference.

BACKGROUND OF THE INVENTION

1. Technical Field

The present invention is directed to an apparatus and method for selecting a web service in response to a request from a client device. More specifically, the present invention is directed to mechanisms for determining when and from what source a web service implementation is to be identified for use by a client device in accessing a web service.

2. Description of Related Art

In service-oriented architectures, the fundamental premise is the reuse of web services across one or more enterprise applications. Web services are services that are offered across the Internet that are built using standard technologies that allow interoperability between systems and applications. Web services are typically invoked by enterprise applications to perform some extended functionality not otherwise available in the enterprise application itself. The enterprise applications and their associated enterprise systems are often referred to as "clients" of the web services that they invoke.

Typically, clients of web services must identify a particular implementation of a web service to invoke. Identification of the particular implementation of a web service to invoke is typically performed at design time, i.e. at the time that the enterprise applications/system is being designed. In other words, the bindings with a particular web services are set at design time and new bindings cannot be added at runtime.

International Business Machines, Inc. (IBM) has developed the Web Services Invocation Framework (WSIF) which is a tool that provides a standard application program interface (API) for invoking services described in the Web Services Description Language (WSDL), no matter how or where the services are provided. WSDL is a standard language used to describe a Web service. Co-developed by Microsoft and IBM, WSDL describes the protocols and formats used by the service. WSDL descriptions can be referenced in a Universal Description, Discovery and Integration (UDDI) directory in order to promote the use of Web services worldwide.

The WSIF architecture enables developers to interact with WSDL-based representations of Web services instead of working directly with the Simple Object Access Protocol (SOAP) APIs, which is the usual programming model. With WSIF, developers can work with the same programming model regardless of how the Web service is implemented and accessed.

The WSIF architecture also allows stub-based and stubless invocation of Web services. A stub is a small software routine placed into a program that provides a common function. Stubs are used for a variety of purposes. For example, a stub may be installed in a client machine, and a counterpart installed in a server, where both are required to resolve some protocol, remote procedure call (RPC) or other interoperability requirement. With the WSIF architecture, no stub is necessary, and the services can be dynamically invoked.

Using WSIF, a client passes a WSDL description of a desired web service to a service factory. The service factory generates a "proxy" for the web service that corresponds to the service element in the WSDL description. The service element defines a number of ports, each of which corresponds to a different format and protocol, that can be used to access the web service described by the WSDL. Typically, all ports map a particular WSDL portType. A "portType" in WSDL is a collection of operations that have been previously defined for a service interface. Known WSIF allows the client to select the port of the service or allows the port to be automatically selected at runtime, but supports only a default selection of the first port encountered. Thus, if more than one port are associated with a particular service, the first port will always be selected.

Once the desired port is identified, it is then used by the client to identify an operation. Eventually, the client calls an "execute" method on the identified operation to actually invoke the service implementation.

Thus, with known service invocation frameworks, the implementation of a web service that is to be invoked is set at design time, or can be explicitly chosen by the client at run time, such as in WSIF. The known systems do not provide an ability to dynamically discover and select a particular implementation of a web service at runtime without explicit action on the part of the client. Furthermore, known systems do not allow for discovery and selection of implementations of services from a group of similar services based on selection preferences without explicit action on the part of the client.

In view of the above, it would be beneficial to have an apparatus and method for dynamic selection of implementations of web services at runtime. It would further be beneficial to have an apparatus and method for determining when such dynamic selection is to be performed and when prior selections of web services should be utilized.

SUMMARY OF THE INVENTION

The present invention provides a mechanism for selecting a web service in response to a request from a client device. More specifically, the present invention is directed to mechanisms for determining when and from what source a web service implementation is to be identified for use by a client device in accessing a web service.

With the apparatus and method of the present invention, when a request is received from a client device for an operation of a web service to be performed, the request is received in an off-ramp device coupled to an on-ramp device that provides an interface to web services. The off-ramp device verifies that the requested service is in a configuration file (i.e. that the service is known to the off-ramp device), and then determines the selection scope of the desired service, as defined in the configuration file. The term "selection scope" as used herein refers to an attribute of a service that identifies when selection of a specific service implementation is to be performed. Examples of different types of selection scope include application selection scope, session selection scope and request selection scope, as described in more detail hereafter.

Based on the selection scope of the desired service, the off-ramp can determine whether to perform discovery and selection of a service implementation, retrieve a service implementation from a session level cache, or retrieve a service implementation from an application level cache.

As mentioned above, a service may have one of a plurality of different selection scopes associated with it and set forth in the description of the service in the configuration file. A first type of selection scope is the "application" selection scope. The "application" selection scope indicates that once a particular implementation of a service is selected, such as through a discovery and selection process, every request that is received by the off-ramp for that service will result in the same service implementation being provided. This in essence makes the selected service implementation the only one that can be used for this type of requested service.

When a client device sends a request for an operation of a service that has "application" selection scope, a determination is made as to whether the service implementation corresponding to the service in the request is presently in an application level cache. If so, the service implementation is retrieved from the application level cache, the operation retrieved from the service implementation, and the operation is then executed.

If the service is not in the application level cache, a service implementation is obtained from the service factory using a discovery and selection approach and the selected service implementation is stored in the application level cache. Thereafter, the operation is obtained from the selected service implementation and executed.

A second type of selection scope is the "session" selection scope. With the "session" selection scope, each time a new session is established, a new service implementation is selected using a discovery and selection methodology. Sessions are established for each requester, i.e. client device, application, or the like.

When the client device sends a request for an operation of a service that has a "session" selection scope, a determination is made as to whether a session exists for the requester that sent the request. If not, a session is created for the requester. Thereafter, a determination is made as to whether the service implementation corresponding to the service in the request is present in the session level cache. If so, the service implementation is retrieved from the session level cache and the operation is retrieved from the service implementation and executed.

If the service implementation is not in the session level cache, the service factory is used to discover and select a service implementation and it is stored in the session level cache. Thereafter, the operation is retrieved from the service implementation and executed.

If the service has neither a session selection scope or application selection scope, in a preferred embodiment, it must have the "request" selection scope. With the "request" selection scope, the service factory is always used to discover and select a service implementation. The operation is then retrieved from the service implementation and then executed.

Of course, in other embodiments, other types of selection scopes may be used in addition to the application, session and request selection scopes without departing from the spirit and scope of the present invention. In such embodiments, additional checks of the type of selection scope assigned to a particular service and determinations as to when to perform discovery and selection of service implementations may be necessary.

These and other features will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
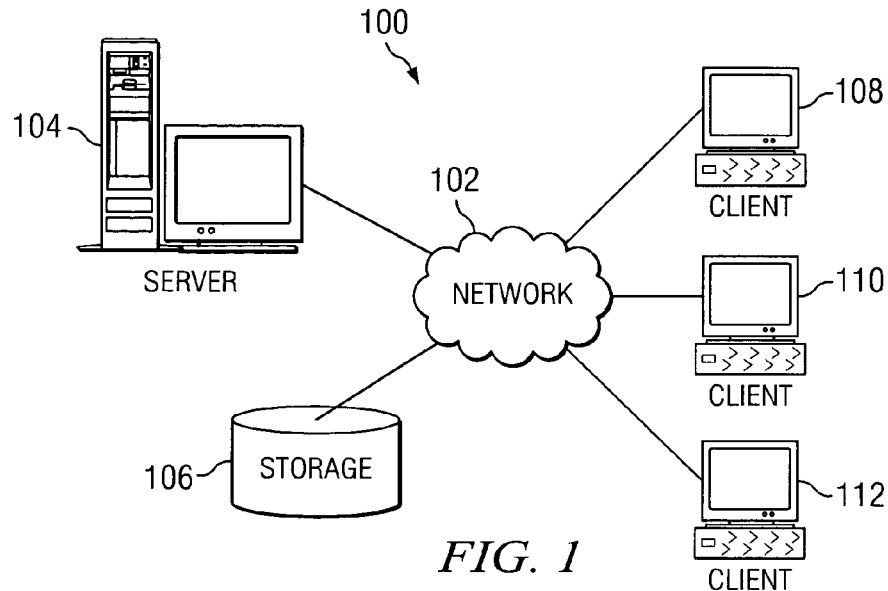
FIG. 1 is an exemplary block diagram of a distributed data processing system in which the present invention may be implemented.
Figure 2:
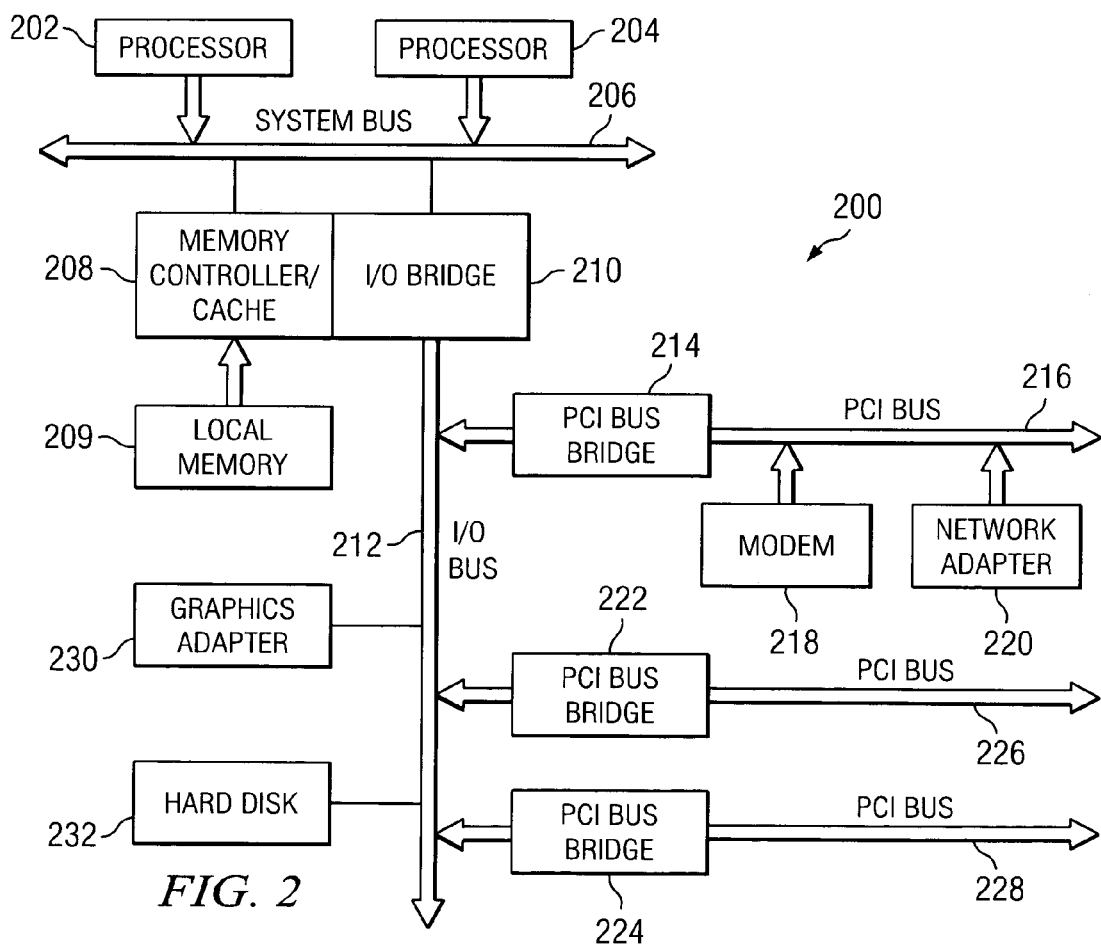
FIG. 2 is an exemplary diagram of a server computing device with which the present invention may operate.
Figure 3:
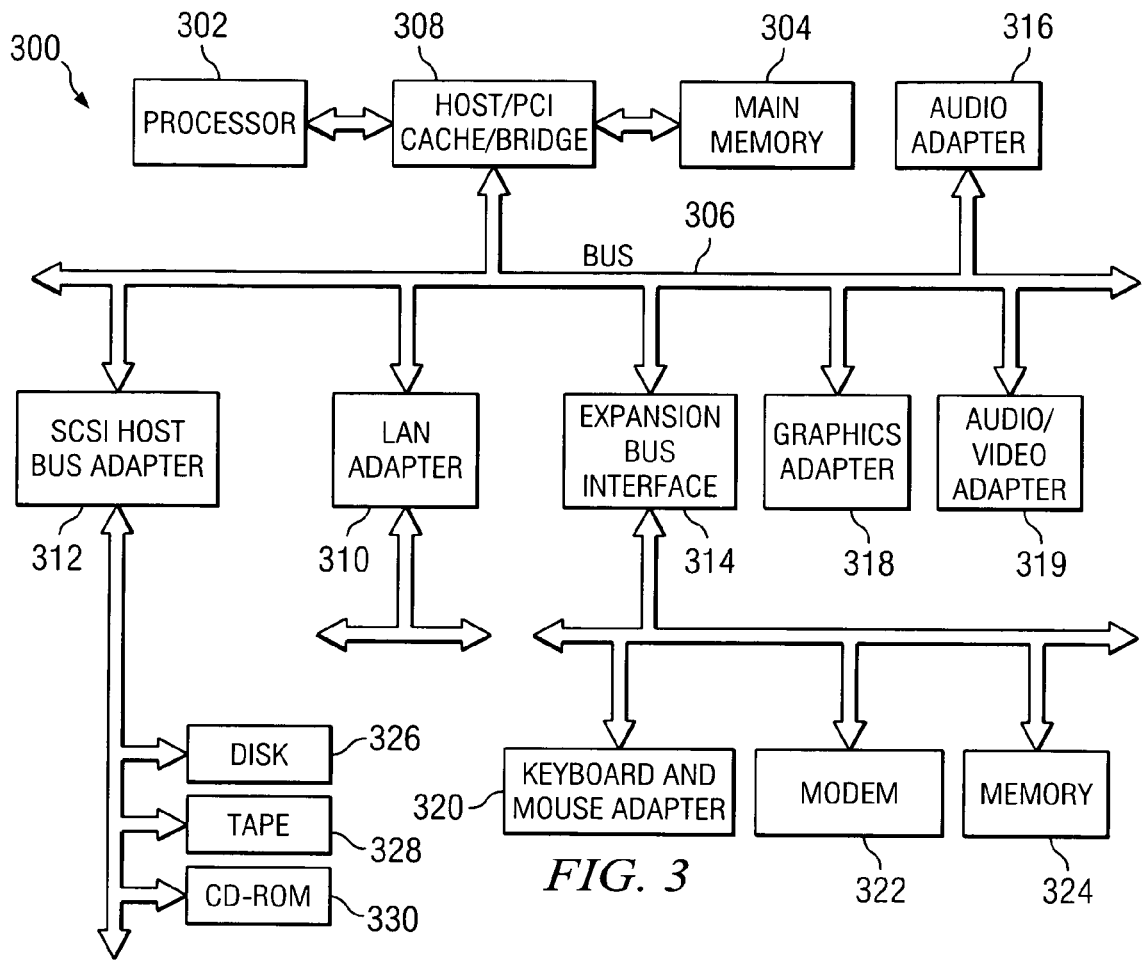
FIG. 3 is an exemplary diagram of a client computing device in which the present invention may be implemented.

As previously mentioned, the present invention is directed to apparatus and methods for the selecting a web service in response to a request from a client device. Since the present invention is directed to the selection of web services, it is prudent to first provide a brief description of the environment in which the present invention may operate. Thus, FIGS. 1–3 provide exemplary diagrams of the computing network and computing devices in which the present invention operates. FIGS. 1–3 are exemplary and are intended to provide a context for the remaining description.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCT bus implementations will support four PCI expansion slots or add-in connectors. Communications links to clients 108–112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With continued reference to FIG. 1, the present invention provides a mechanism for dynamic identification of web services at runtime. That is, in the distributed data processing system depicted in FIG. 1, some servers, such as server 104, may provide web services that may be invoked by business applications of web services client devices, such as client devices 108 and 110. With the present invention, the particular implementation of a web service to be invoked by a business application is identified dynamically at runtime based on certain criteria rather than having the implementation fixed at design time.

The present invention will be described in terms of an extension to the Web Services Invocation Framework (WSIF) available from International Business Machines, Inc. (see www.alphaworks-ibm.com/tech/wsif for more information regarding WSIF). However, the present invention is not limited to use with the WSIF architecture. The present invention may be used with other types of web services frameworks, such as Apache Axis or Java JAX-RPC, and the like, without departing from the spirit and scope of the present invention.

With regard to the exemplary embodiments herein which are illustrated as an extended version of the WSIF, the present invention provides a mechanism for determining how to invoke a web service operation requested by a client device. In some cases, the present invention makes use of an enhanced "service factory" that is used to perform dynamic discovery and selection of web services implementations at runtime. This enhanced "service factory" is described in detail in the co-pending and commonly assigned U.S. patent application Ser. No. 10/314,813, entitled "Dynamic Web Service Implementation Discovery and Selection Apparatus and Method" which has been hereby incorporated by reference. Some of the description provided in U.S. patent application Ser. No. 10/314,813 is reproduced hereafter in order to provide a context in which to understand the present invention.

In standard WSIF, a service factory is provided that is used to generate a "proxy" for a service that is used by a client device to access an actual service implementation on a server. With standard WSIF, a Web Services Description Language (WSDL) document is provided to the service factory. The WSDL document contains a service element, which in turn contains one or more port elements. The port element of a WSDL document describes the binding and an endpoint for that binding. The binding relates a portType to the protocol, e.g., HyperText Transport Protocol (HTTP), to be used to access the web service and the endpoint is the particular source of the web service, e.g., www.alphaworks.ibm.com is an endpoint. The portType is a collection of operations that have been defined for the web service, i.e. the portType is an abstract definition of the interface for the web service.

From a WSDL definition, the service factory in the known WSIF generates a service object that is used to access the web service identified by the binding and the endpoint. Thus, in standard WSIF, the particular implementation of a web service that is to be invoked by a business application is set by the WSDL document passed to the service factory.

With the present invention, an enhanced "service factory" is utilized, as described in the incorporated U.S. patent application Ser. No. 10/314,813, which examines the portType information for a desired service. When a client uses the enhanced service factory of the present invention to generate a service object, the enhanced service factory first invokes a pluggable discovery mechanism, giving it the WSDL description of the service and portType information. From the WSDL description and the portType, the enhanced service factory compiles, via the pluggable discovery mechanism, a list of candidate web services implementations that implement the identified portType. This may be done by querying a Universal Description, Discovery and Integration (UDDI) registry, a Web Services Inspection Language (WSIL) registry, and the like, to identify registered web services implementations that implement the identified portType. Alternatively, more complex searches may be performed using the same portType information and/or additional information, e.g. a webcrawler type device may be used to identify services that implement the identified portType.

Once the candidate list is compiled by the enhanced service factory, the list is provided to a pluggable selection mechanism that selects an implementation from the candidate list to be used to generate the service object for the business application. The selection mechanism selects a candidate from the candidate list based on criteria established by the pluggable selection mechanism. This criteria may be, for example, service level agreements, cost, availability, enterprise preferences, or basically any criteria the selection mechanism chooses to use.

Once a candidate is selected, a service object is created in the manner known in the art. Thus, the present invention provides a mechanism for dynamically selecting a web service implementation at runtime based on established criteria. This criteria may, in itself, be dynamically changeable by modifying the rules and/or parameters used by the selection mechanism for selecting a candidate from the candidate list. Similarly, the discovery mechanism may be dynamically changeable by changing the particular registries and/or operations performed to identify candidate service implementations.

Figure 4:
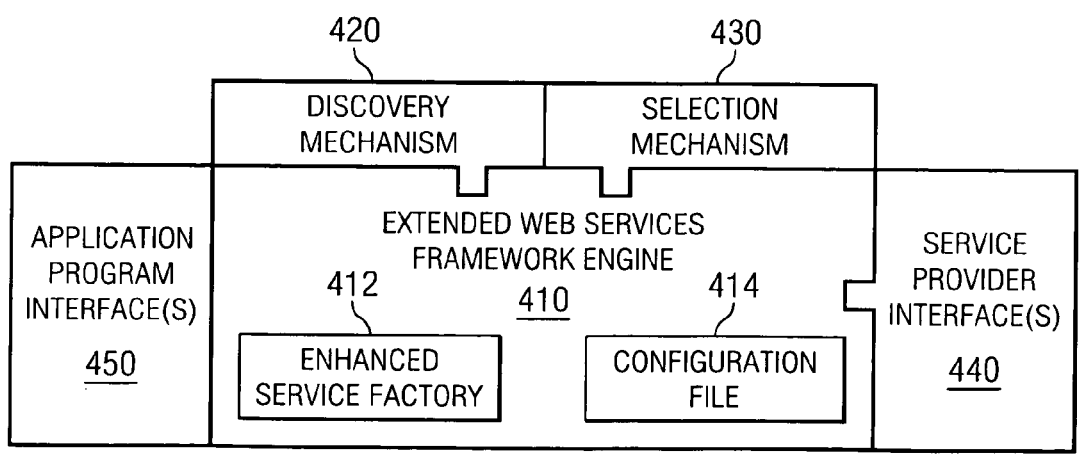
FIG. 4 is an exemplary diagram illustrating an web services framework runtime view in accordance with the present invention.

FIG. 4 is an exemplary diagram illustrating an web services framework runtime view in accordance with the present invention. The particular embodiment shown in FIG. 4 is an enhanced version of WSIF in which pluggable discovery and selection mechanisms are provided and in which the application program interfaces are adapted to make use of the discovery and selection mechanisms. However, the present invention, as previously discussed, is not limited to WSIF. Rather, any web services framework in which dynamic discovery and selection mechanisms according to the present invention may be used, is intended to be within the spirit and scope of the present invention.

As shown in FIG. 4, an extended web services invocation framework (WSIF) engine 410 is provided with a pluggable discovery mechanism 420, a pluggable selection mechanism 430, pluggable web services provider interfaces 440, and application program interfaces 450 which are adapted to implement the discovery and selection mechanisms in the manner described hereafter. The extended WSIF engine 410 includes an enhanced service factory 412 and a configuration file 414, among other elements not explicitly shown. The elements 410, 412 and 420–450 may be implemented in software, hardware, or any combination of software and hardware. In a preferred embodiment, the elements 410, 412 and 420–450 are implemented as software instructions executed by one or more computing devices.

The extended WSIF engine 410 provides a framework for the invocation of web services by business applications. The extended WSIF engine 410 according to the present invention is enhanced over known WSIF engines in that the extended WSIF engine 410 is enhanced to make use of the pluggable discovery mechanism 420 and selection mechanism 430. With the extended WSIF engine 410, a configuration file 414 is provided that identifies the service portTypes that are known by the extended WSIF engine 410 as well as default discovery and selection mechanisms that are used in the case that a requested service portType is not known by the extended WSIF engine 410.

The enhanced service factory 412 is invoked by service requests from business applications received via the application program interfaces 450. The enhanced service factory 412, in response to receiving a WSDL description of a desired service from a client via the application program interfaces 450, identifies a portType of the desired service and invokes the discovery mechanism 420 to identify candidate service implementations. Specifically, the enhanced service factory 412 compares the requested portType against the configuration file 414. If the portType is present in the configuration file, the associated discovery and selection attributes are used to govern the discovery and selection of candidate service implementations. If the portType is not present in the configuration file, then default discovery and selection attributes are used.

The discovery mechanism 420 invoked, in a preferred embodiment, is based on the discovery parameter identified in the configuration file 414. When the discovery mechanism 420 receives the portType from the enhanced service factory 412, the discovery mechanism 420 performs a search of sources for services that implement the portType. Alternatively, a more complex search may be performed based on a rules set associated with the identified discovery mechanism 420. In a preferred embodiment, a discovery mechanism 420 sends queries to registries, such as a UDDI and/or WSIL registry, requesting that information associated with services implementing the identified portType be returned to the discovery mechanism 420. This information may include, for example, the WSDL document, binding and/or endpoint for the registered web service implementation. The discovery mechanism 420 compiles a candidate list based on the responses received and provides this candidate list to the enhanced service factory 412.

The enhanced service factory 412 then provides the candidate list to the selection mechanism 430 identified from the configuration file 414. The selection mechanism 430 uses a rule set and parameters for identifying which of the candidates from the candidate list should be selected for use in creating the service object that will be used by the business application for invoking a service implementation. The particular rules and parameters utilized are dependent on the particular selection mechanism. Examples of such rules include, but are not limited to, requirements based on a service level agreement, cost, availability, geographic proximity, and so on The selection mechanism 430 selects a candidate from the candidate list and provides the selected candidate to the enhanced service factory 412. The enhanced service factory 412 then operates in a known manner to generate a service object for invoking the selected implementation of the requested service. The selected implementation of the requested service may then be accessed using the service object via the provider interfaces 440.

The present invention makes use of the extended web services framework engine 410, discovery and selection mechanisms 420 and 430, enhanced service factory 412 and configuration file 414 to identify candidate service implementations and select one of the service implementations to be used in providing the operation requested by a requester, e.g., a client device or a particular application on a client device. The present invention further provides mechanisms for reducing the amount of discovery and selection necessary by providing a selection scope attribute to the services defined in the configuration file 414 along with functionality for operating based on the type of selection scope defined for a particular service.

The term "selection scope" as it is used herein refers to an attribute defining when discovery and selection of a service implementation is to be performed. That is, the attribute defines the "scope" for which a particular selection of a service implementation remains valid. Thus, depending on the particular type of selection scope assigned to a service, once a service implementation is selected for that service, requests for that service may result in the same service implementation being provided to the requesting application. Examples of selection scopes used by a preferred embodiment of the present invention include an application selection scope, session selection scope, and request selection scope, each of which are described in more detail hereafter. Of course additional selection scopes may be defined in addition to, or in replacement of, these three selection scopes without departing from the spirit and scope of the present invention.

Figure 5:
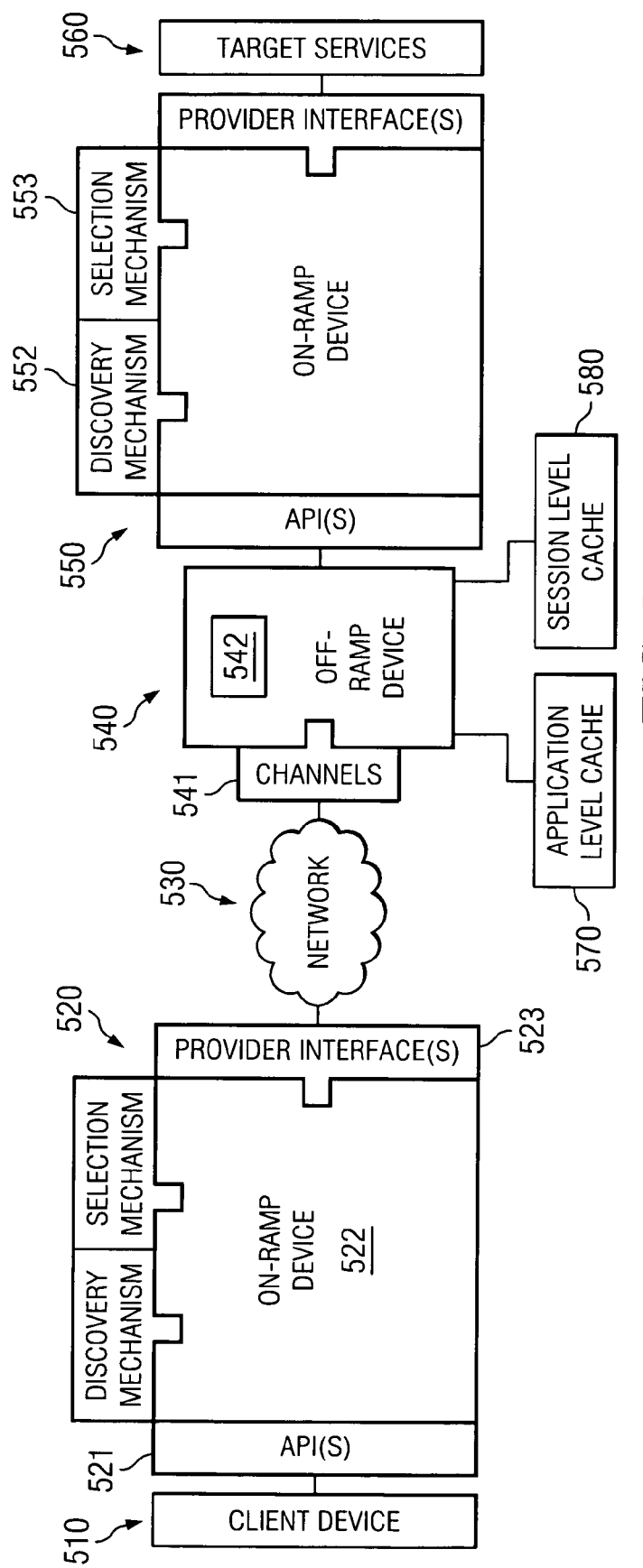
FIG. 5 is an exemplary diagram illustrating a web services "bus" according to the present invention.

FIG. 5 is an exemplary diagram illustrating a web services "bus" according to the present invention. With the present invention, on a client side of the system, a client device 510 is coupled to a network 530 via an extended web services framework on-ramp device 520. The on-ramp uses the extended WSIF just described to permit client-side selection of the implementor of the desired web service interface (or portType). On a server side of the system, requests from client devices are received over the network 530 via the off-ramp device 540. Target services 560 are accessed through the on-ramp device 550 which is used to perform discovery and selection of target service implementations based on WSDL service definitions defined by the off-ramp configuration file 542.

With the present invention, the client device 510 includes one or more applications running on the client device 510. These applications interface with the on-ramp device 520 via the application program interfaces (APIs) 521 that take the operations performed by the application requiring a web service and provide operation information to the on-ramp device 520 which generates a request for a web service operation using WSDL service descriptions. The web service operation request is then sent to the off-ramp 540 via the provider interface(s) 523, network 530 and channels 541.

The off-ramp device 540 receives the request for a web service operation from the on-ramp device 520 and checks a configuration file 542 to determine if the requested web service identified in the request is recognized by the off-ramp device 540. That is, a determination is made as to whether the portType identified in the request for a web service operation is found in the configuration file 542. If the portType specified is not in the configuration file 542, a fault is returned to the client.

The portType in the configuration file 542 has an associated selection scope, or simply "scope", that identifies when discovery and selection of a web service implementation for the portType is to be performed. The off-ramp device 540 determines whether to perform web service discovery and selection using discovery mechanism 552 and selection mechanism 553 or not based on the selection scope identified by the portType in the configuration file 542.

The selection scope, in a preferred embodiment, may be set to one of three types: application, session or request. The "application" type scope indicates that once a particular implementation of a web service is selected, such as through a discovery and selection process, every subsequent request identifying that portType received by the off-ramp will result in the same web service implementation being provided. This in essence makes the selected web service implementation the only one that can be used for this portType.

The "session" type scope indicates that each time a new session is established for a requester, and a request for a web service operation identifying a particular portType is received, a new web service implementation is selected using a discovery and selection methodology. The selected web service implementation, however, remains in effect for the entire session. Thus, if a subsequent request for a web service operation is received that identifies the same portType, and a new session has not been established, then the same web service implementation will be provided to the requester. However, when a new session is established, a new web service implementation will be identified using the discovery and selection process previously discussed above.

The "request" type scope indicates that discovery and selection of a web service implementation is to be performed with each request for that portType. Thus, each time a request for a web service operation is received that identifies a portType whose selection scope is "request", a new web service implementation is identified using the discovery and selection process, regardless of whether a session has been established or not.

The selection scopes described above are only exemplary of a preferred embodiment of the present invention. Other selection scopes may be used with the present invention in addition to, or in replacement of, the selection scopes described above without departing from the spirit and scope of the present invention.

When a client device sends a request for an operation of a web service to the off-ramp device 540, the off-ramp device 540 first compares the portType identified in the request to the portTypes in the configuration file 542. If the portType exists in the configuration file 542, its associated attributes are then used to determine how to identify a web service implementation to perform the requested operation. If the portType does not exist in the configuration file 542, a fault is generated.

Having found the portType in the configuration file 542, the off-ramp device 540 determines the selection scope associated with the portType. If the selection scope is an application type scope, a determination is made as to whether the web service implementation corresponding to the portType in the request is presently in an application level cache 570. This is done by traversing the application level cache 570 to identify a service object that supports the portType.

If the application level cache 570 includes a service object that supports the portType, the service object is retrieved from the application level cache 570. The requested operation is then retrieved from the service object. The operation is then executed and the results returned to the client device 510.

In a preferred embodiment, WSIF defines classes that map to the entities defined in WSDL, e.g., service, port, portType, operation. The service factory is a factory for service objects. The service object is a factory for port objects. The port object is a factory for operation objects. It is the service object that is stored in a cache, as necessary. Therefore, to retrieve an operation from a service object, a service object is retrieved from a service factory object or from a cache, a port object is retrieved from the service object, and finally, an operation object is retrieved from the port object.

If a web service object supporting the requested portType is not in the application level cache 570, a web service implementation is obtained from the service factory using a discovery and selection approach as described in incorporated U.S. patent application Ser. No. 10/314,813. The selected web service implementation definition is then used to generate a service object that is stored in the application level cache 570 and to perform the requested operation.

If the portType has a selection scope that is a session type scope, the off-ramp device 540 determines if a session exists for the requester that sent the request. This determination may be done using any of a number of different methodologies without departing from the spirit and scope of the present invention. In a preferred embodiment, HTTP sessions are used to determine if there is a session that exists for the requester. Of course there are many possible implementations of the present invention with regard to determining if a session exists for a requester. Some implementations are dependent on the actual communication mechanism between the client device and server device, which may or may not be HTTP. In other implementations, the actual client device may be identified by credentials provided along with the request for the web service, e.g., a digital certificate or identity token.

If a session has not been established for the requester, a session is created. The particular mechanism for creating a session may be dependent on the particular implementation and/or communication protocol used.

Thereafter, a determination is made as to whether a web service implementation corresponding to the portType in the request is present in a session level cache 580. The session level cache 580 is traversed to identity any service object that supports the requested portType. If the session level cache 580 has a service object that supports the requested portType, the service object is retrieved from the session level cache 580. The requested operation is then retrieved from the service object and executed. The results are then returned to the client device 510.

If the session level cache 580 does not include a service object that supports the requested portType, the service factory is used to discover and select a web service implementation. The web service implementation definition is then used to generate a service object that is stored in the session level cache 580. The service object is then used to perform the requested operation and return results to the client device 510.

If the portType has neither a session type scope or application type scope, it must have the request type scope. With the request type scope, the service factory is always used to discover and select a web service implementation. The web service implementation definition is then used to generate a service object that performs the requested operation and returns results to the client device 510.

In the above process, it is possible that when the operation is executed after having identified a service object to perform the operation, the operation may not execute successfully. This may occur, for example, if the network between the server on-ramp and the actual service provider is malfunctioning, or if the actual service provider is malfunctioning. In such a case, error recovery may be performed. That is, a new web service implementation may be discovered and selected using the service factory in the event of an error occurring, and the process of generating a service object, placing the service object in the application level or session level cache, retrieving the operation, executing the operation, and determining if the operation executed successfully may be repeated based on this new web service implementation. This process may be repeated up to a predetermined number of retry attempts at which time a fault may occur if the operation still does not execute successfully.

Figures 6, 8:
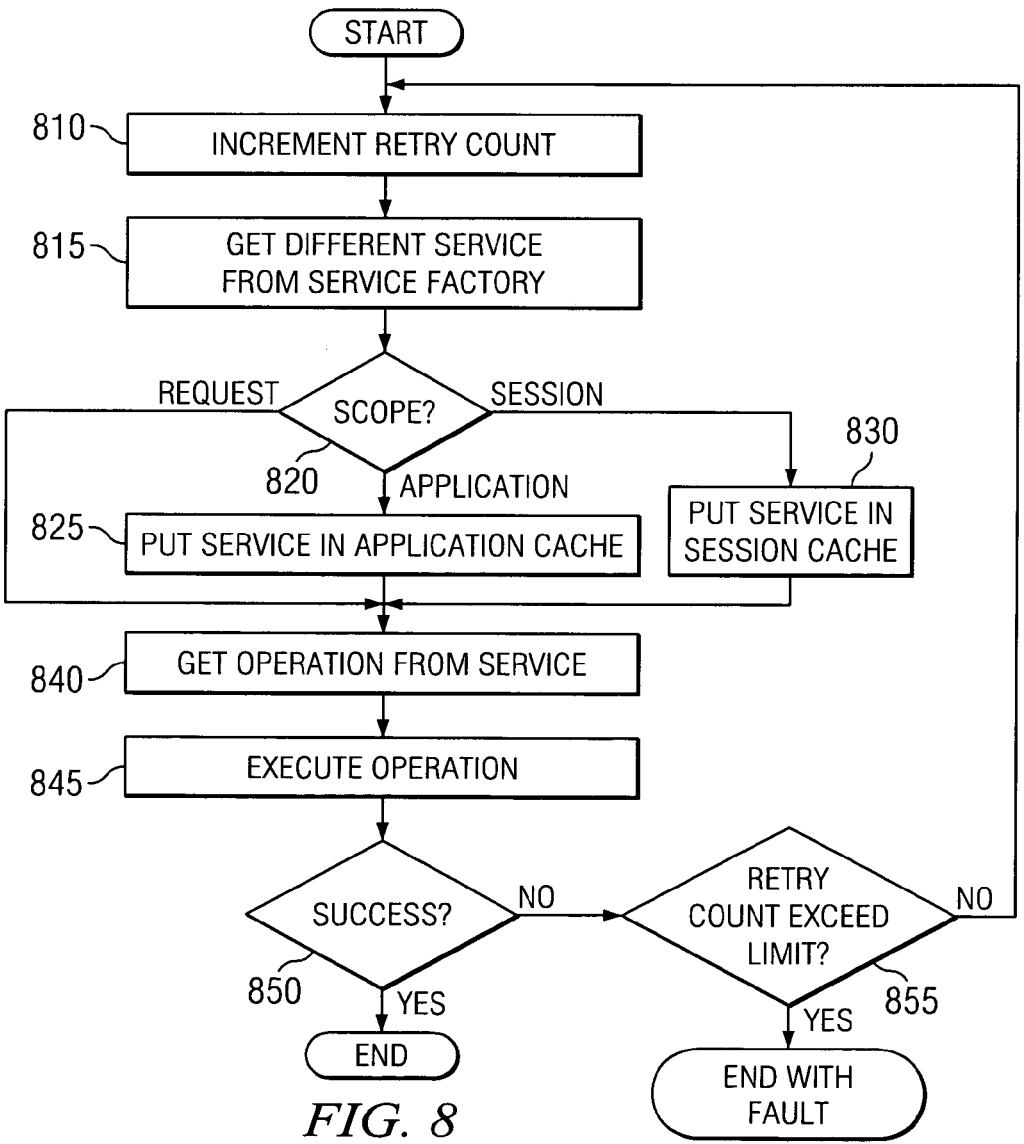
FIG. 6 is an exemplary diagram illustrating a configuration file format in accordance with the present invention.
FIG. 8 is a flowchart outlining an exemplary operation of the present invention with regard to error recovery in the invocation of a service operation.

FIG. 6 is an exemplary diagram illustrating a configuration file format in accordance with the present invention. As shown in FIG. 6, the configuration file 600 includes a default discovery and selection mechanism 610, and one or more portTypes 620–630 known to the off-ramp. The portType 620 includes attributes of serviceName, which is a "nickname" for the portType, selection scope (selScope), failover, discovery, selection, and the like. The selection scope attribute has been discussed at length above. The failover attribute identifies whether or not to retry execution of the operation using a newly discovered web service implementation in the event of an unsuccessful execution attempt. This attribute may be set to a value of true (retry enabled until a successful execution is performed), false (retry disabled), or a number n of retry attempts.

Figure 7:
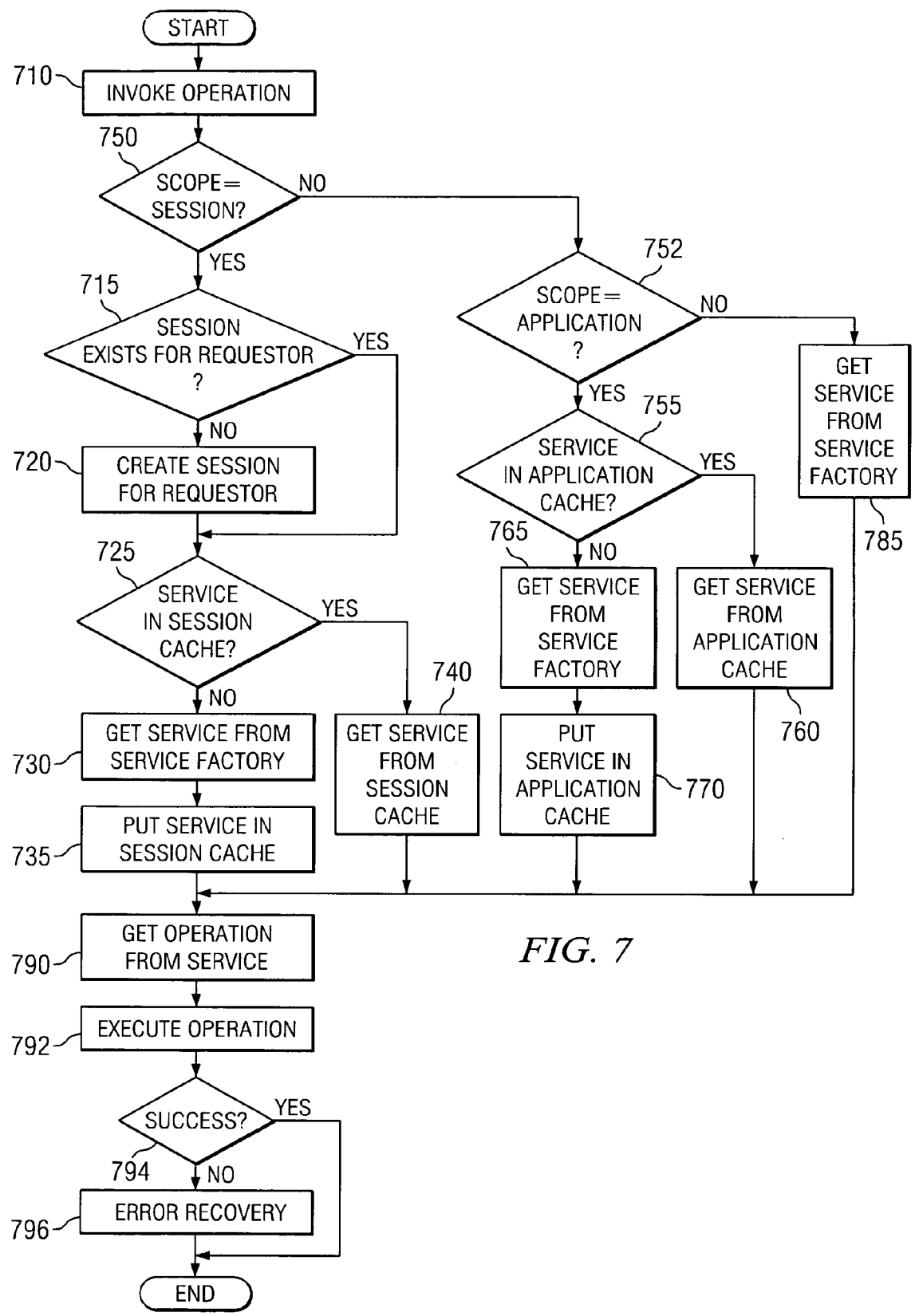
FIG. 7 is flowchart outlining an exemplary operation of the present invention when invoking a service operation.

FIG. 7 is flowchart outlining an exemplary operation of the present invention when invoking a service operation. As shown in FIG. 7, the operation starts with an invoke operation, i.e. a request for a web service operation being received (step 710). A determination of whether the scope is session is made (step 750). If the scope is "session," a determination is made as to whether a session exists for the requester (step 715). If not, a session is created for the requester (step 720).

Thereafter, or if a session has already been created, a determination is made as to whether the service is in the session level cache (step 725). If not, the service is obtained from the service factory (step 730) and put into the session level cache (step 735). If the service is in the session level cache, it is retrieved from the session level cache (step 740).

If the scope is not "session" (step 750) then a determination is made as to whether the scope is "application" (step 752). If so, then a determination is made as to whether the service is in the application level cache (step 755). If so, then the service is retrieved from the application level cache (step 760). If the service is not in the application level cache, the service is obtained from the service factor (step 765) and placed in the application level cache (step 770).

If the scope is not "application" (step 752), then the scope must be "request" and the service is retrieved using the service factory (step 785). Thereafter, or after steps 735, 740, 760, or 770, the operation is retrieved from the service (step 790) and executed (step 792). A determination is then made as to whether the operation executed successfully (step 794). If not, error recovery is performed (step 796). Otherwise, the operation terminates.

FIG. 8 is a flowchart outlining an exemplary operation of the present invention with regard to error recovery in the invocation of a service operation. As shown in FIG. 8, the operation starts by incrementing a retry count (step 810). A different service (portType) implementation is then obtained from the service factory (step 815). A determination is then made as to the scope of the portType (step 820). If the scope is "application" the service is placed in the application level cache (step 825). If the scope is "session", the service is placed in the session level cache (step 830). Thereafter, or if the scope is "request", the operation is retrieved from the service (step 840) and executed (step 845). A determination is then made as to whether the operation executed successfully (step 850). If not, a determination is made as to whether the number of retries has exceeded a limit (step 855). If not, the operation returns to step 810, otherwise the operation ends with a fault.

Thus, the present invention provides a mechanism for determining when to perform discovery and selection of web services implementations based on attributes associated with a requested portType. Based on these attributes, it may be determined whether to always perform discovery and selection, perform discovery and selection once a session, or perform discovery and selection only once and then provide the same web service implementation for every subsequent request for that portType.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for invoking a service operation, comprising:
   receiving a request for a web service operation;
   determining a selection scope associated with a web service for providing the web service operation, wherein the determination includes identifying an element of a configuration file associated with a porType for the web service and identifying the selection scope in the element of the configuration file, wherein the selection scope defines a duration for which an implementation of the web service remains valid;
   retrieving a web service implementation based on the selection scope; and
   providing the web service operation using the web service implementation.

2. The method of claim 1, wherein the selection scope is determined based on a portType of the web service.

3. The method of claim 1, wherein the selection scope is one of an application selection scope, a session selection scope and a request selection scope.

4. The method of claim 1, wherein if the selection scope is an application selection scope, retrieving a web service implementation based on the selection scope includes:
   determining if a web service object for the web service implementation exists in an application level cache; and
   retrieving the web service object from the application level cache if the web service object is in the application level cache.

5. The method of claim 1, wherein if the selection scope is an application selection scope, retrieving a web service implementation based on the selection scope includes:
   determining if a web service object for the web service implementation exists in an application level cache; and
   using a discovery mechanism and selection mechanism to obtain a web service implementation if the web service object is not in the application level cache.

6. The method of claim 1, wherein if the selection scope is a session selection scope, retrieving a web service implementation based on the selection scope includes:
   determining if a web service object for the web service implementation exists in a session level cache; and
   retrieving the web service object from the session level cache if the web service object is in the session level cache.

7. The method of claim 1, wherein if the selection scope is a session selection scope, retrieving a web service implementation based on the selection scope includes:
   determining if a web service object for the web service implementation exists in a session level cache; and
   using a discovery mechanism and selection mechanism to obtain a web service implementation if the web service object is not in the session level cache.

8. The method of claim 1, wherein retrieving a web service implementation based on the selection scope includes:
   determining if a web service object for the web service implementation exists in a cache;
   retrieving the web service object for the web service implementation from the cache if the web service object is in the cache; and
   performing discovery and selection of a web service implementation if the web service object is not in the cache.

9. The method of claim 1, wherein the selection scope indicates that once a web service implementation is selected for a designated portType, all subsequent requests for web services supporting the designated portType make use of the selected web service implementation.

10. The method of claim 1, wherein the selection scope indicates that a web service implementation is selected for web service operation requests from a requester only once per session for a designated portType.

11. The method of claim 1, wherein providing the web service operation using the web service implementation includes:
   executing the web service operation using the web service implementation;
   determining if the web service operation executed successfully; and
   performing error recovery if the web service operation did not execute successfully.

12. The method of claim 11, wherein performing error recover includes selecting a new web service implementation using a discovery mechanism and selection mechanism.

13. A computer program product in a computer readable medium for invoking a service operation, comprising:
   first instructions for receiving a request for a web service operation;
   second instructions for determining a selection scope associated with a web service for providing the web service operation, wherein the determination includes instructions for identifying an element of a configuration file associated with a porType for the web service and identifying the selection scope in the element of the configuration file wherein the selection scope defines a duration for which an implementation of the web service remains valid;
   third instructions for retrieving a web service implementation based on the selection scope; and
   fourth instructions for providing the web service operation using the web service implementation.

14. The computer program product of claim 13, wherein the selection scope is determined based on a portType of the web service.

15. The computer program product of claim 13, wherein the selection scope is one of an application selection scope, a session selection scope and a request selection scope.

16. The computer program product of claim 13, wherein if the selection scope is an application selection scope, the third instructions for retrieving a web service implementation based on the selection scope include:
   instructions for determining if a web service object for the web service implementation exists in an application level cache; and
   instructions for retrieving the web service object from the application level cache if the web service object is in the application level cache.

17. The computer program product of claim 13, wherein if the selection scope is an application selection scope, the third instructions for retrieving a web service implementation based on the selection scope include:
   instructions for determining if a web service object for the web service implementation exists in an application level cache; and
   instructions for using a discovery mechanism and selection mechanism to obtain a web service implementation if the web service object is not in the application level cache.

18. The computer program product of claim 13, wherein if the selection scope is a session selection scope, the third instructions for retrieving a web service implementation based on the selection scope include:
   instructions for determining if a web service object for the web service implementation exists in a session level cache; and
   instructions for retrieving the web service object from the session level cache if the web service object is in the session level cache.

19. The computer program product of claim 13, wherein if the selection scope is a session selection scope, the third instructions for retrieving a web service implementation based on the selection scope include:
   instructions for determining if a web service object for the web service implementation exists in a session level cache; and
   instructions for using a discovery mechanism and selection mechanism to obtain a web service implementation if the web service object is not in the session level cache.

20. The computer program product of claim 13, wherein the third instructions for retrieving a web service implementation based on the selection scope include:
   instructions for determining if a web service object for the web service implementation exists in a cache;
   instructions for retrieving the web service object for the web service implementation from the cache if the web service object is in the cache; and
   instructions for performing discovery and selection of a web service implementation if the web service object is not in the cache.

21. The computer program product of claim 13, wherein the selection scope indicates that once a web service implementation is selected for a designated portType, all subsequent requests for web services supporting the designated portType make use of the selected web service implementation.

22. The computer program product of claim 13, wherein the selection scope indicates that a web service implementation is selected for web service operation requests from a requester only once per session for a designated portType.

23. The computer program product of claim 13, wherein the fourth instructions for providing the web service operation using the web service implementation include:
   instructions for executing the web service operation using the web service implementation;
   instructions for determining if the web service operation executed successfully; and
   instructions for performing error recovery if the web service operation did not execute successfully.

24. The computer program product of claim 23, wherein the instructions for performing error recover include instructions for selecting a new web service implementation using a discovery mechanism and selection mechanism.

25. An apparatus for invoking a service operation, comprising:
   means for receiving a request for a web service operation;

means for determining a selection scope associated with a web service for providing the web service operation including identifying an element of a configuration file associated with a porType for the web service and identifying the selection scope in the element of the configuration file;

means for retrieving a web service implementation based on the selection scope; and means for providing the web service operation using the web service implementation.

* * * * *